United States Patent [19]
Corrigan et al.

[11] Patent Number: 5,801,818
[45] Date of Patent: Sep. 1, 1998

[54] ACTIVE REFLEX OPTICAL RANGE FINDER

[75] Inventors: Patrick Corrigan; Ulrich Hugel, both of Tigard, Oreg.

[73] Assignee: ActiFlex Corporation, Tigard, Oreg.

[21] Appl. No.: 854,301

[22] Filed: May 12, 1997

[51] Int. Cl.$^6$ .............................. G01C 3/08; G01N 21/00
[52] U.S. Cl. ............................... 356/5.01; 356/73.1
[58] Field of Search .................... 356/5.01, 383, 356/73.1; 359/110, 152; 342/43

[56] References Cited

U.S. PATENT DOCUMENTS

| | | | |
|---|---|---|---|
| 3,981,592 | 9/1976 | Williams | 356/237 |
| 4,994,675 | 2/1991 | Levin et al. | 250/551 |
| 5,149,961 | 9/1992 | Arnold et al. | 250/227.11 |
| 5,455,672 | 10/1995 | Lamonde et al. | 356/73.1 |

OTHER PUBLICATIONS

TIA/EIA Standard —Commercial Building Telecommunications Cabling Standard —Oct. 1995.

*Primary Examiner*—Mark Hellner
*Attorney, Agent, or Firm*—Chernoff, Vilhauer, McClung & Stenzel, LLP

[57] ABSTRACT

A measuring system includes a first circuit that produces a first signal. A transmission line has a first end and a second end where the first end is interconnected with the first circuit so as to receive the first signal. A second circuit is remotely located from the first end of the transmission line and interconnected with the second end of the transmission line so as to detect the first signal. The second circuit in response to detecting the first signal produces a second signal that is received by the second end of the transmission line. The first circuit detects the second signal and in response determines the length of the transmission line. The first signal and the second signal preferably have different frequencies and the transmission line is preferably a fiber optic cable.

17 Claims, 10 Drawing Sheets

ACTIVE REFLEX OPTICAL RANGE FINDER

BACKGROUND OF THE INVENTION

The present invention relates to a measuring system for determining the length of cables.

Traditionally, in-building cabling systems used for computer data communications applications were designed to meet the specifications of each particular computer system. In other words, a system from one vendor would often not work with cabling designed for another vendor's system. In many cases, even different systems from the same vendor required totally different cabling systems. Accordingly, there was a great likelihood that the cable would need to be replaced each time the old data system was replaced or modified to accommodate the new protocol for the new system, at considerable time and expense.

During the past few years a number of standards organizations around the world, including the Telecommunications Industry Association (TIA) and the Electronics Industry Association (EIA) in the United States, have promulgated standards for installing data cabling in commercial buildings. TIA/EIA-568A from the TIA and EIA, CAN/CSA-T529-M91 from the Canadian Standards Association (CSA), and ISO/IEC JTC 1/SC 25/WG 3IS 11801 from the International Standards Organization (ISO) and the International Electrotechnical Commission (IEC), are examples of the current design and installation standards, and are incorporated herein by reference. Although some differences exist between these standards, they are basically similar. Since the TIA/EIA standards are commonly accepted in the United States, further reference will be made to them when more specific details are helpful for clarity. One of the primary purposes of the cabling standards, which incorporate both copper and optical fiber cable, is to allow the installation of building communication cabling systems that are nearly universal in application. These standards specify cable characteristics, such as maximum attenuation, maximum length, and maximum frequency. In turn the vendors of cabling, cabling components, data communication products, and telecommunications products ensure that their particular products and systems can support these standards. This alleviates the need to replace existing cables each time a computer system or communications system is changed. This also provides a cabling system that can be used for nearly all communication needs, including voice, data, and video. Local area networks, telephone systems, ASCII terminals, and video transmission systems can use cabling designed to meet these standards.

One cable characteristic specified by all three standards is maximum cable length. The currently accepted technique to measure the length of an optical fiber cable requires the use of an optical time-domain reflectometer (OTDR). The OTDR is connected to one end of the cable under test and launches a pulse of light into the cable from one end. The OTDR then detects the pulse's reflected signal when it returns to the end where it originated. The length of the fiber is calculated from the elapsed time required for the light pulse to travel to the distant end of the fiber from the OTDR and return back to the OTDR. The length of the fiber is calculated as the speed of light in a vacuum times the relative velocity of propagation of light in the fiber times the elapsed time. The result is then divided by two because the pulse travels twice the length of the cable. Because of imperfections in the cable, additional reflections may occur at other locations along the length of the cable that frequently provide false indications of the cable length. In addition, only a small fraction of the light transmitted into the cable is returned as back scatter from the end of the cable. Accordingly, a high power laser is required to provide a sufficiently strong light pulse suitable for detection after reflection. The interference due to multiple reflections within the cable may be high in comparison to the level of the return signal making it difficult, if not impossible, to accurately determine the length of the cable. Also, the OTDR requires sophisticated electronics to permit the length determination of the cable.

Since a conventional OTDR accesses only one end of the fiber, light detected by the OTDR has to travel from the OTDR through the fiber to a feature of interest, such as the other end, and then the weakly backscattered or reflected remaining light must return to the OTDR along the same path for detection. The light suffers twice the attenuation of a one way path and is very weak. Also, the OTDR must detect backscattered light which is typically less than 0.1% of the light power traveling in the fiber. These factors result in a weak signal reaching the OTDR and thus the OTDR requires the use of expensive avalanche photodiodes and a complex high speed digital averager to make reasonably accurate measurements. In addition, human interpretation of the OTDR waveform is typically required, and in some cases the results can be ambiguous and lead to false interpretation.

The TIA/EIA-568-A testing standards (TIS/EIA-568-A Annex H) only require a test for attenuation, or signal loss. Attenuation is the most important factor affecting optical fiber cabling performance. This test, commonly referred to as a loss test, is performed using a light source installed at one end of the cable and an optical power meter installed at the other end of the cable to measure the attenuation of the light from the light source. Acceptable attenuation varies based on the cable length, the type of cable under test, and the frequency of the light used for the test, as outlined in EIA/TIA-568-A Annex H. If a cable fails the loss test, then a cable defect, improperly installed connector, or excessive length is usually the cause.

Although the EIA/TIA-568-A specifies the maximum cable length, it does not specifically require a length test. However, many vendors of cable and cabling components warranty cabling systems installed by their authorized installers and frequently require the installer to perform a length test before they will provide warranty coverage.

The cabling standards specify two basic categories of cabling: horizontal and backbone. Horizontal cabling connects a work area (the location of attached equipment, such as a telephone or a personal computer) to a telecommunications closet, which is a centralized connecting point for horizontal cables. Backbone cabling connects multiple telecommunications closets. Horizontal cabling, which typically does not go outside a building, has a maximum installed length of 90 meters, while backbone cabling, which can run between buildings, can have a maximum length of up to 3,000 meters. TIA/EIA-568-A Annex H specifies allowable attenuation for horizontal optical fiber cabling as less than 2 dB at a wavelength of 850 nm or 1300 nm. Allowable attenuation for backbone cabling is based on the following relation:

maximum allowable cable attenuation (dB)=
attenuation coefficient (dB/km)×length (km)

where the attenuation coefficient is a specific value for the particular type of optical fiber cable under test and the test frequency used. An accurate length measurement is important in order to obtain an accurate loss test.

What is desired, therefore, is a simple inexpensive measurement system for determining the length of an optical fiber cable that does not rely on human interpretation of the results.

SUMMARY OF THE PRESENT INVENTION

The present invention overcomes the aforementioned drawbacks of the prior art by providing a measuring system that includes a first circuit that produces a first signal and a second circuit that produces a second signal. A transmission line has a first end and a second end where the first end is interconnected with the first circuit so as to receive the first signal. The second circuit is remotely located from the first end of the transmission line and interconnected with the second end of the transmission line so as to detect the first signal. The second circuit in response to detecting the first signal produces the second signal that is received by the second end of the transmission line. The first circuit detects the second signal and in response determines the length of the transmission line. The first signal and the second signal preferably have different frequencies and the transmission line is preferably a fiber optic cable.

The measuring system directly senses the signal launched into one end of the cable from the other end of the cable, therefore the signal only has to travel one length of the cable, the signal is much stronger, and avalanche photodiodes and complex signal averaging are unnecessary. Also, the measuring system directly measures the time of flight of light through the cable from one end to the other. This arrangement does not require sophisticated signal analysis or human interpretation, and unambiguous results are obtained regardless of the complexity of the cable routing. Further, the first circuit and the second circuit preferably do not detect their own signals that they launch and therefore cannot falsely respond to reflections within the cable.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
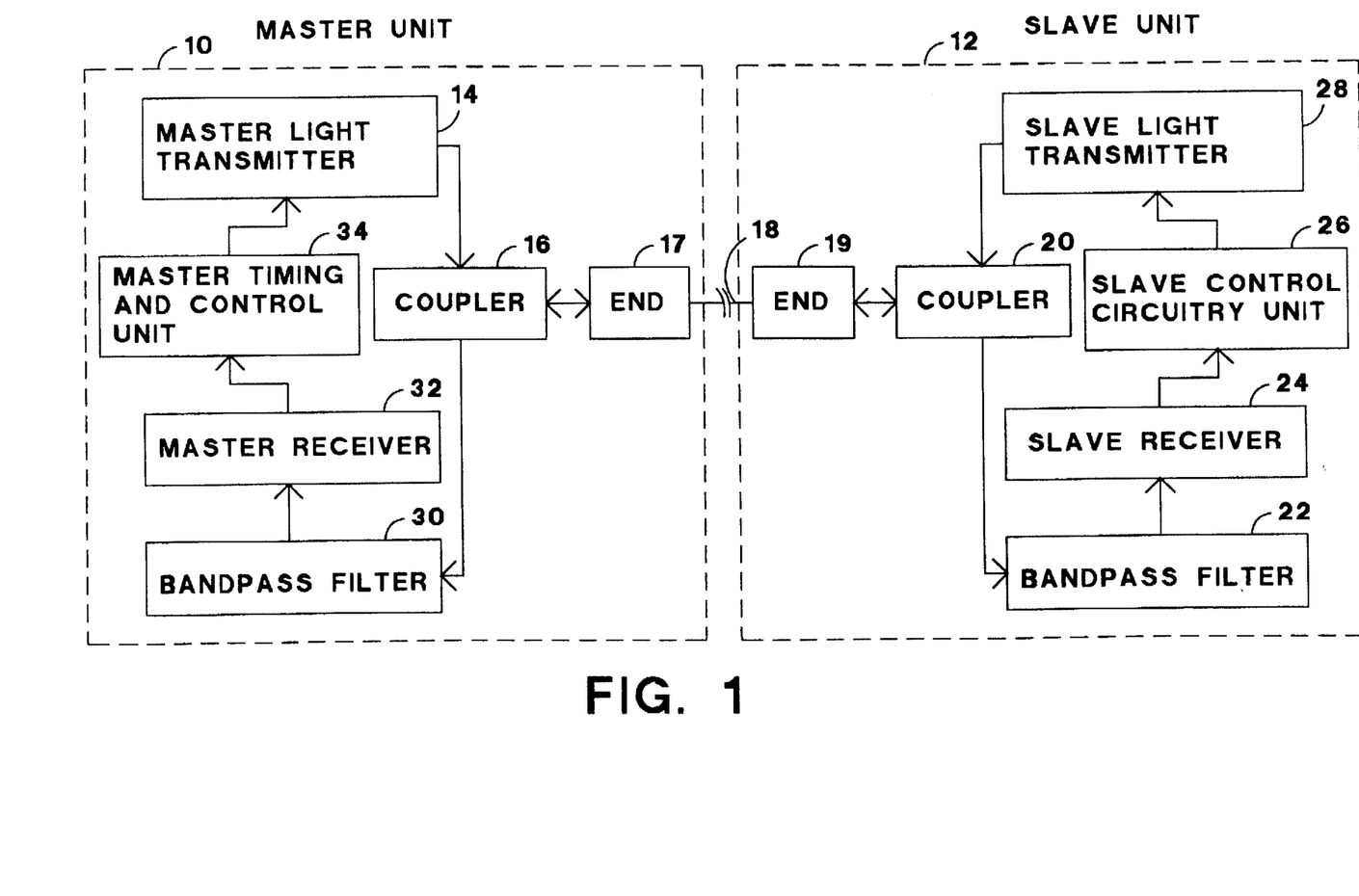
FIG. 1 is a block diagram of an exemplary embodiment of a reflex system of the present invention that includes a master unit and a slave unit interconnected by a cable suitable to measure the length of the cable.

Referring to FIG. 1, a measurement system, referred to herein as a reflex system, includes an optical fiber cable 18 that interconnects a master unit 10 and a slave unit 12. It is to be understood that the cable may be any suitable transmission line, such as a copper wire, a twisted pair of cables, or an2 optical fiber cable. The master unit 10 includes a master timing and control unit 34 that triggers a master light transmitter 14 to emit a pulse of light with a particular wavelength, referred to as the master unit wavelength. Alternatively, the master unit wavelength may be any suitable range of wavelengths, or selection of wavelengths. A coupler 16 couples the light from the master light transmitter 14 to the end 17 of the cable 18. The light from the master unit 10 is transmitted within the cable 18 to the other end 19 of the cable 18. The slave unit 12 includes a coupler 20 which receives incident light from the end of the cable 18. The received light in the slave unit 12 is filtered by a bandpass filter 22, or other suitable filter, in order to filter out light with wavelengths that are different from the master unit wavelength. A slave receiver 24 detects light from the filter 22 and indicates the occurrence of detecting a light pulse to the slave control circuitry unit 26. In response, the slave control circuitry unit 26 triggers a slave light transmitter 28 to emit a pulse of light with a particular wavelength, referred to as the slave unit wavelength. Alternatively, the slave unit wavelength may be any suitable range of wavelengths, or selection of wavelengths. The coupler 20 couples the light from the slave light transmitter 28 to the end 19 of the cable 18. The light from the slave unit 12 is transmitted within the cable 18, received by the coupler 16, and passed to a bandpass filter 30, or other suitable filter, in order to filter out light with wavelengths that are different from the slave unit wavelength. A master receiver 32 detects light from the filter 30 and indicates the occurrence of detecting a light pulse to the master timing and control unit 34. The primary purpose of the filters 22 and 30 are to reject any additional reflected light, such as, the master unit's 10 own master unit wavelength and the slave unit's own slave unit wavelength. In this manner, the slave unit 12 is only sensitive to the light with the master unit wavelength and the master unit is only sensitive to the light with the slave unit wavelength. Further, additional reflections of light traveling within the cable 18 will not provide false indications. Preferably, the master unit wavelength and the slave unit wavelength are different. However, the master unit wavelength and the slave unit wavelength may be the same, if desired. It is to be understood that other types of pulses may be used that are suitable for the particular cable, such as, voltage and current signals.

The master timing and control unit 34 includes a nanosecond resolution timer which measures the elapsed time from the launch of the master unit wavelength pulse to the arrival of the slave unit wavelength pulse. The master unit 10 and slave unit 12 are calibrated to account for the fixed time delays in the measurement system so that the actual time of flight (TOF) of light in the cable 18 is obtained. Knowing the TOF and the velocity of propagation of light in the cable 18 permits the calculation of the cable's 18 length. The following relation is used:

$$l = ct/2n$$

where:

l is the length to be determined, c is the velocity of light in a vacuum, $2.9979 \times 10^8$ m/s, t is the measured time of flight of light in the fiber, and n is the index of refraction of the fiber, a material property.

The reflex system uses a master unit 10 and a slave unit 12, each of which is connected to a different end of the cable 18 and remotely located or spaced apart from each other to make a distance measurement which greatly relaxes the demands made on the opto-electronics and the signal processing system required by prior devices, such as OTDR equipment. Since a conventional OTDR accesses only one end of the fiber, light detected by the OTDR has to travel from the OTDR through the fiber to a feature of interest, such as the other end, and then the weakly backscattered or reflected remaining light must return to the OTDR along the same path. The light from the OTDR then suffers twice the attenuation of a one way path and is much weaker. Also, the OTDR must detect backscattered light which is typically less than 0.1% of the light power transmitted to the fiber. These factors result in a very weak signal reaching the OTDR and require the use of expensive avalanche photodiodes and a complex high speed digital averager, as previously described. Because the reflex system of the present invention directly senses the light launched into one end of the fiber 18 from the other end of the fiber 18, and the light only has to travel one length of the cable 18, the signal is much stronger and avalanche photodiodes and complex signal averaging are unnecessary. In addition, a conventional OTDR must analyze the backscatter signal to infer the location of the end of the fiber. This inferring of the end of the fiber requires complex software or a skilled operator. In contrast, the reflex system directly measures the time of flight of light through the fiber from one end to the other. This arrangement does not require sophisticated signal analysis or human interpretation, and unambiguous results are obtained regardless of the complexity of the cable routing. Also multiple reflective features in a fiber can cause an "echoing" effect on the light signal which a conventional OTDR has difficulty analyzing and sometimes results in failure to locate the end of the fiber. In the reflex system the master and slave units preferably do not detect their own light that they launch and therefore cannot falsely respond to reflections within the fiber. Further, current TIA/EIA-568-A Annex H testing specifications require the installer to perform the loss test from both ends of the cable 18, so measuring the length of the cable 18 from both ends of the cable 18 creates little or no additional burden.

Figure 2:
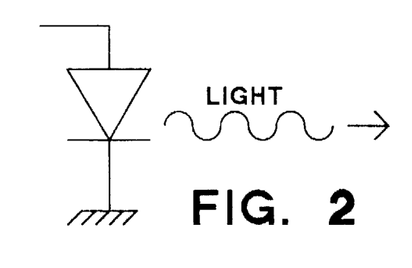
FIG. 2 is a diode type light transmitter suitable for the master unit and slave unit of FIG. 1.
Figure 3:
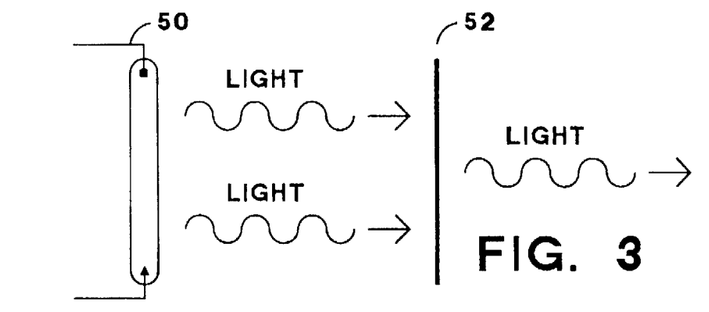
FIG. 3 is a filtered gas discharge tube light transmitter suitable for the master unit and slave of FIG. 1.

Referring to FIG. 2, the preferred master light transmitter 14 and slave light transmitter 28 are electro-optic converters such as a laser diode or a light emitting diode. Referring to FIG. 3, the master light transmitter 14 and slave light transmitter 28 may alternatively be filtered gas discharge tubes, such as a short arc flash lamp 50 followed by an optical bandpass filter 52 that passes the desired wavelength of light, such as the master unit wavelength or slave unit wavelength.

The preferred master receiver 32 or the slave receiver 24 for detecting light of a particular wavelength is a fast opto-electric converter, such as a photo diode. Alternatively, the master receiver 32 or the slave receiver 24 may be a phototube, such as a photomultiplier tube.

Figure 4:
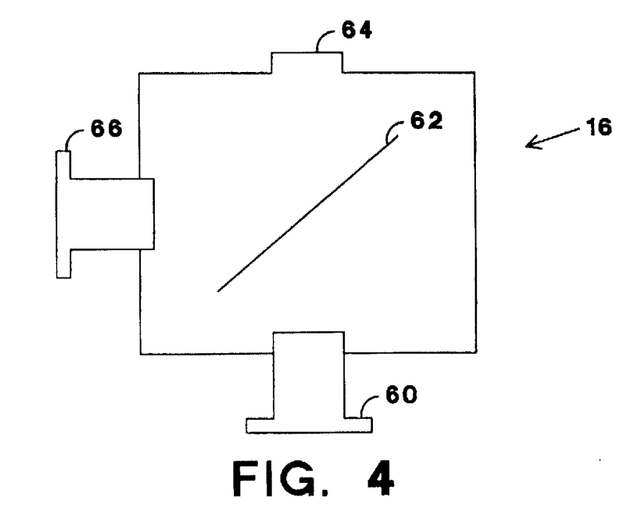
FIG. 4 is a bulk optics coupler suitable to connect the master unit and the slave unit to the cable of FIG. 1.

Referring to FIG. 4, the preferred coupler 16 is a miniature bulk optics arrangement with a wavelength filter of the master unit wavelength. The light with the slave unit wavelength is then detected by the master receiver 32. The light emitted from the master light transmitter 14 is incident on port 60 of the coupler 16. The light from port 60 of the master unit wavelength passes through a beam splitter 62 and is focussed into a common port 64. The end 17 of the cable 18 is coupled to the common port 64 to receive the incident light. Light incident on the common port 64 with the slave unit wavelength from the slave unit 12 is received by the coupler 16. The received light with the slave unit wavelength is then reflected by the beam splitter 62 to port 66. Light with the slave unit wavelength does not pass through the beam splitter 62, unlike light with the master unit wavelength, because the beam splitter 62 is a dichroic mirror which is transparent to light of the master unit wavelength while reflecting light of the slave unit wavelength. The light with the slave unit wavelength is then detected by the master receiver 32. Any light which may be incident on the common port 64 from the cable 18 with the master unit wavelength will pass through the beam splitter 62 and therefore not be incident on the port 66 nor detected by the master receiver 32. The coupler 16 provides the wavelength separating behavior required to keep the coupler sensitive to light with the slave unit wavelength from the cable 18 and insensitive to light with the master unit wavelength from the cable 18. Likewise, the coupler 20 would have a beam splitter that is sensitive to light with the master unit wavelength from the cable 18 and insensitive to light with the slave unit wavelength from the cable 18.

Figure 5:
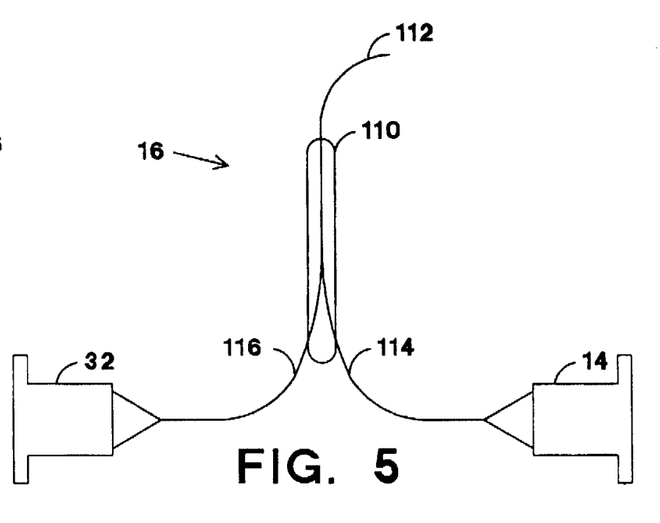
FIG. 5 is a fused biconical taper fiber coupler suitable to connect the master unit and the slave unit to the cable of FIG. 1.

Referring to FIG. 5, an alternative embodiment of the coupler 16 is a fused biconical taper fiber coupler, such as a wavelength division multiplexer (WDM) or a wideband coupler. The WDM 110 is a three fiber port device. Common port 112 is common to both the slave unit wavelength and the master unit wavelength, and is coupled to the cable 18. Port 114 couples only the master unit wavelength from the master light transmitter 14 to the common port 112. The common port 112 couples only light of the slave unit wavelength from the cable 18 to port 116. Port 114 and port 116 are coupled to the master light transmitter 14 and master receiver 32, respectively. The coupler 16 shown in FIG. 5 likewise provides the wavelength separating behavior required to keep the coupler sensitive to light with the slave unit wavelength from the cable 18 and insensitive to light with the master unit wavelength from the cable 18. Likewise, the coupler 20 would be sensitive to light with the master unit wavelength from the cable 18 and insensitive to light with the slave unit wavelength from the cable 18.

Figure 6:
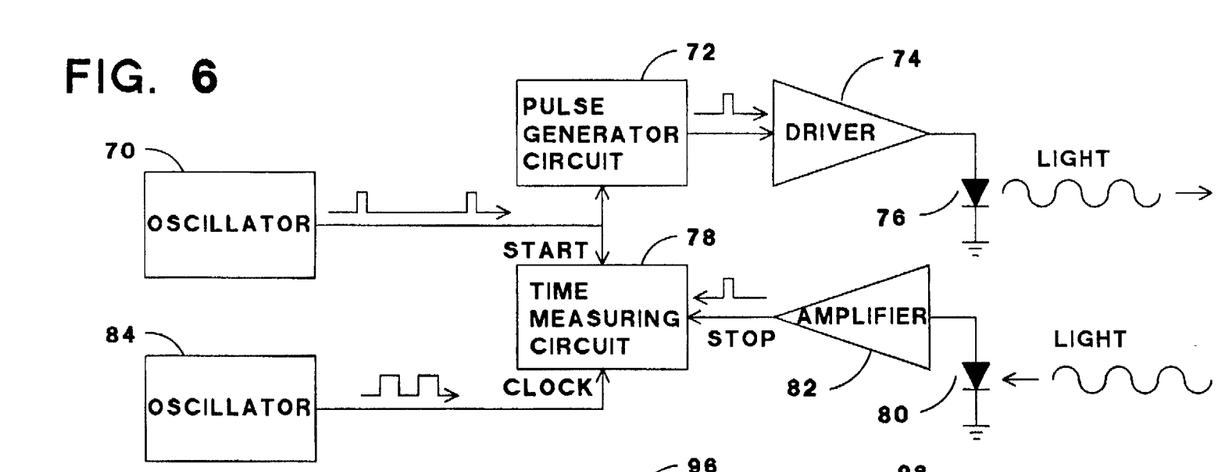
FIG. 6 is a block diagram of the master unit of FIG. 1.

Referring to FIG. 6, the master timing and control unit 34 includes an oscillator 70 which provides a signal that periodically triggers a single pulse generating circuit 72. The output of the pulse generating circuit 72 is amplified by a driver 74 to supply current to an electro-optic converter (master light transmitter 14), such as a laster diode or light emitting diode 76. Simultaneously with the emission of the single pulse from the pulse generating circuit 72 a timer circuit 78 starts measuring the elapsed time. When an opto-electric converter (master receiver 32), such as a photo diode 80 senses a returning optical pulse with an appropriate wavelength, the signal is amplified by an amplifier 82 and the timer circuit 78 stops incrementing the timer. At this point the timer circuit 78 has a record of the elapsed time from the transmission of the master unit signal down the cable to the return of the slave unit signal from the cable, including additional delay from the electronic circuitry. The timer circuit 78 may be any suitable circuit, such as, an analog time to amplitude converter followed by an analog-to-digital converter, or a digital counter driven by a reference clock oscillator 84. The resolution of the timer can be finer than the clock period from the reference clock oscillator 84 by use of interpolation, or by the use of a technique such as a clock oscillator which is uncorrelated with the electro-optic drive oscillator combined with averaging. Since the start of the acquisition clock and the counter reference oscillator clock are uncorrelated, the phase of the reference oscillator clock varies randomly relative to the start acquisition pulse. The counter can only count integers, therefore if the period being measured is not an integral number of reference oscillator clock periods, the counter will randomly return counts corresponding to times that are sometimes greater than the actual period being measured, and sometimes less than the actual period being measured. The statistical distribution of the occurrence of the two count values is a function of the actual period being measured. For example: suppose that the period being measured is exactly 1.5 periods of the counter reference oscillator clock. If 1,000,000 measurements were made, approximately 500,000 counts of 1 would be read and approximately 500,000 counts of 2 would be read. The average of these counts is 1.500. The quantization noise decreases with the square root of the number of averages, so 1,000,000 averages would give a result accurate to three decimal places. The time counting, averaging, and display may be accomplished with a single chip microcontroler.

Figure 7:
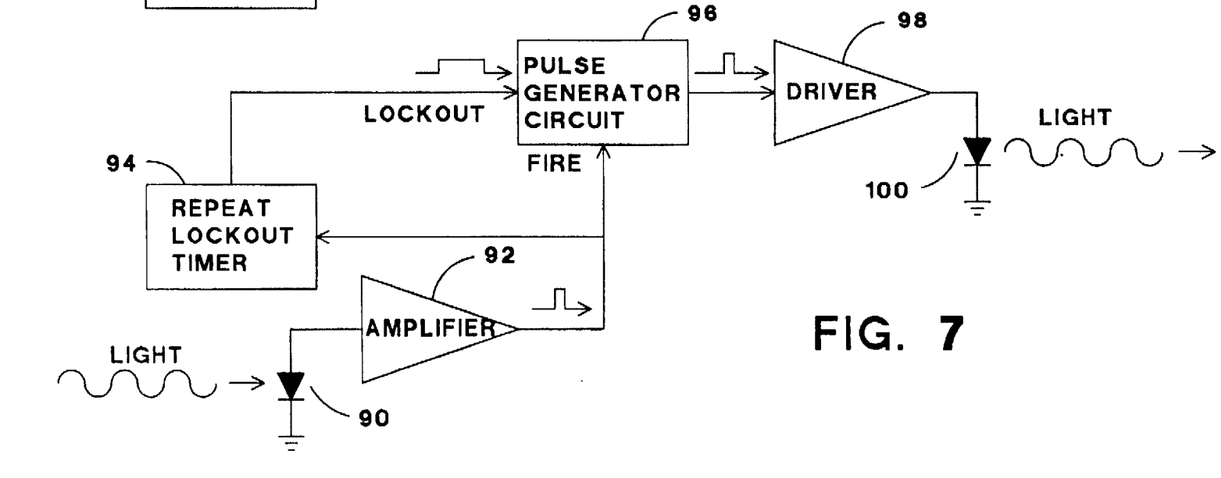
FIG. 7 is a block diagram of the slave unit of FIG. 1.

Referring to FIG. 7, the slave control circuitry unit 26 includes an opto-electric converter, such as a photodiode 90, that senses an incident optical pulse. The output of the photodiode 90 is amplified by an amplifier 92 which in turn triggers two single pulse generating circuits, namely, a repeat lockout timer 94 and a pulse generator circuit 96. Upon triggering, the pulse generator circuit 96 immediately produces a short pulse which is amplified by a driver 98 to supply current to an electro-optic converter, such as a laser diode or light emitting diode 100. The repeat lockout timer 94 generates a delay pulse which defeats the pulse generator 96, so as to inhibit another optical pulse for a set amount of time. This is a method for preventing the slave unit 12 from responding to reflections of its own optical pulses if a filter is not used. Also the slave bandpass filter 22 can be omitted by use of the slave repeat lockout timer 94.

Figure 8:
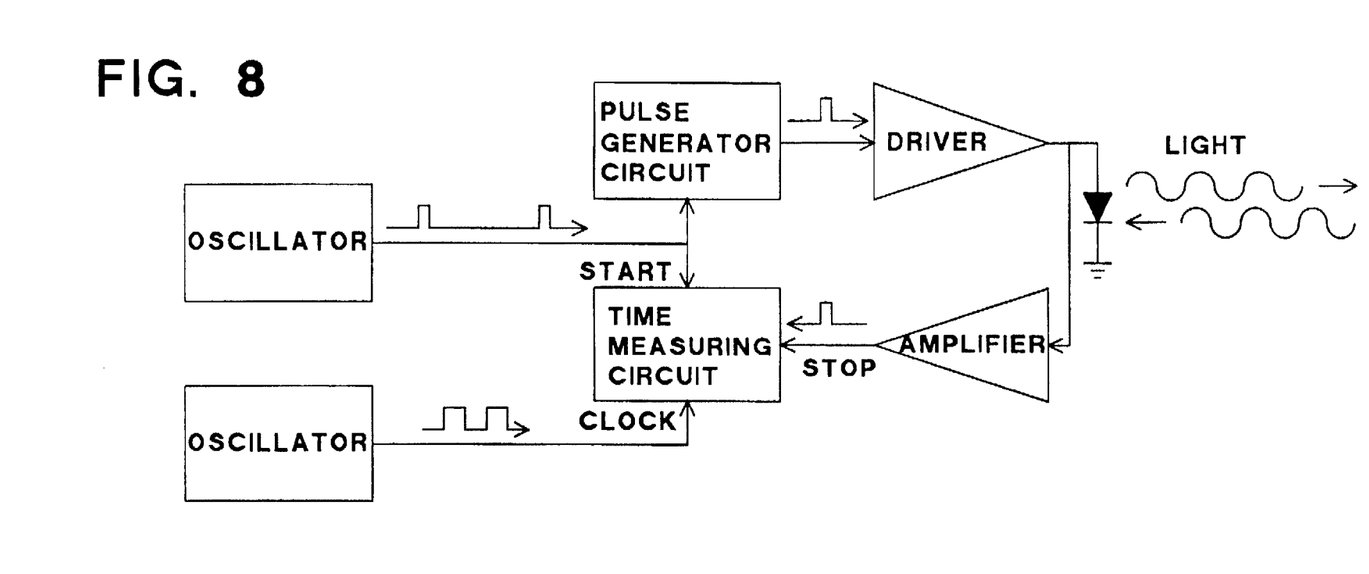
FIG. 8 is an alternative block diagram of the master unit of FIG. 1.
Figure 9:
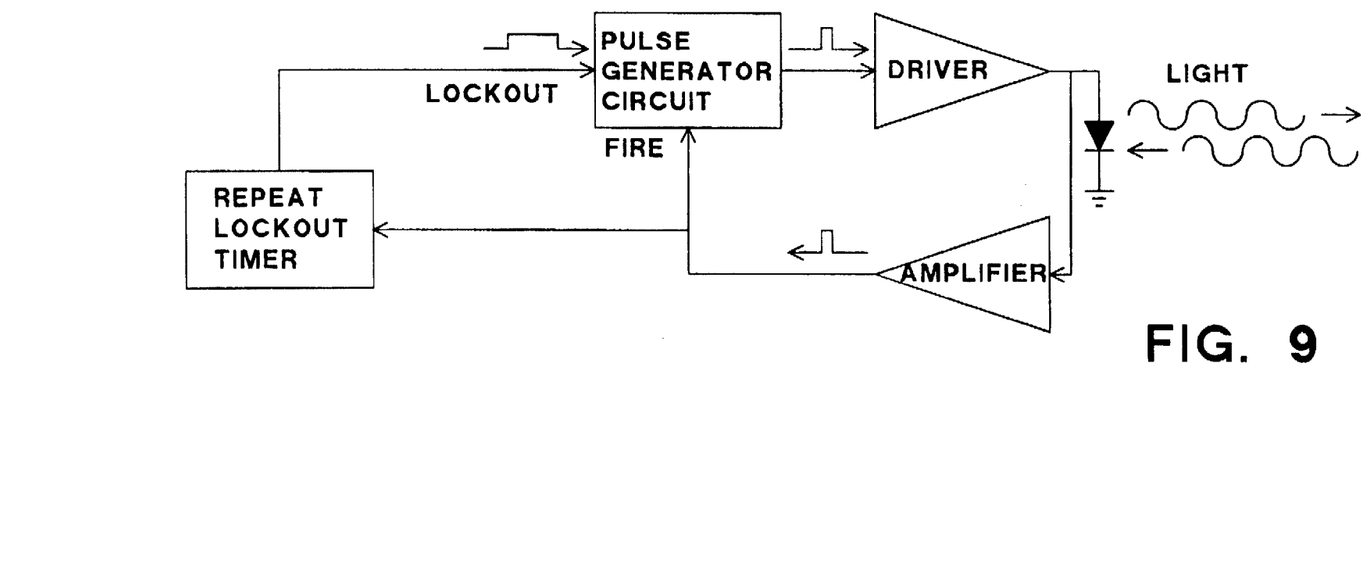
FIG. 9 is an alternative block diagram of the slave unit of FIG. 1.
Figure 10:
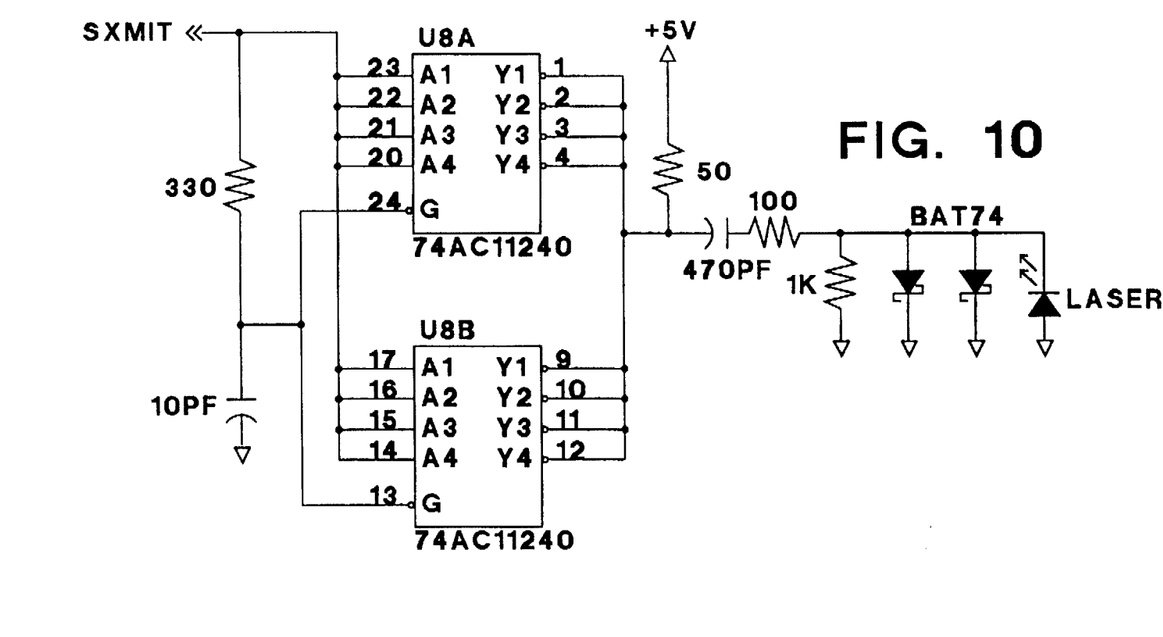
FIG. 10 is an exemplary schematic of the slave light transmitter shown in FIG. 1.
Figure 11:
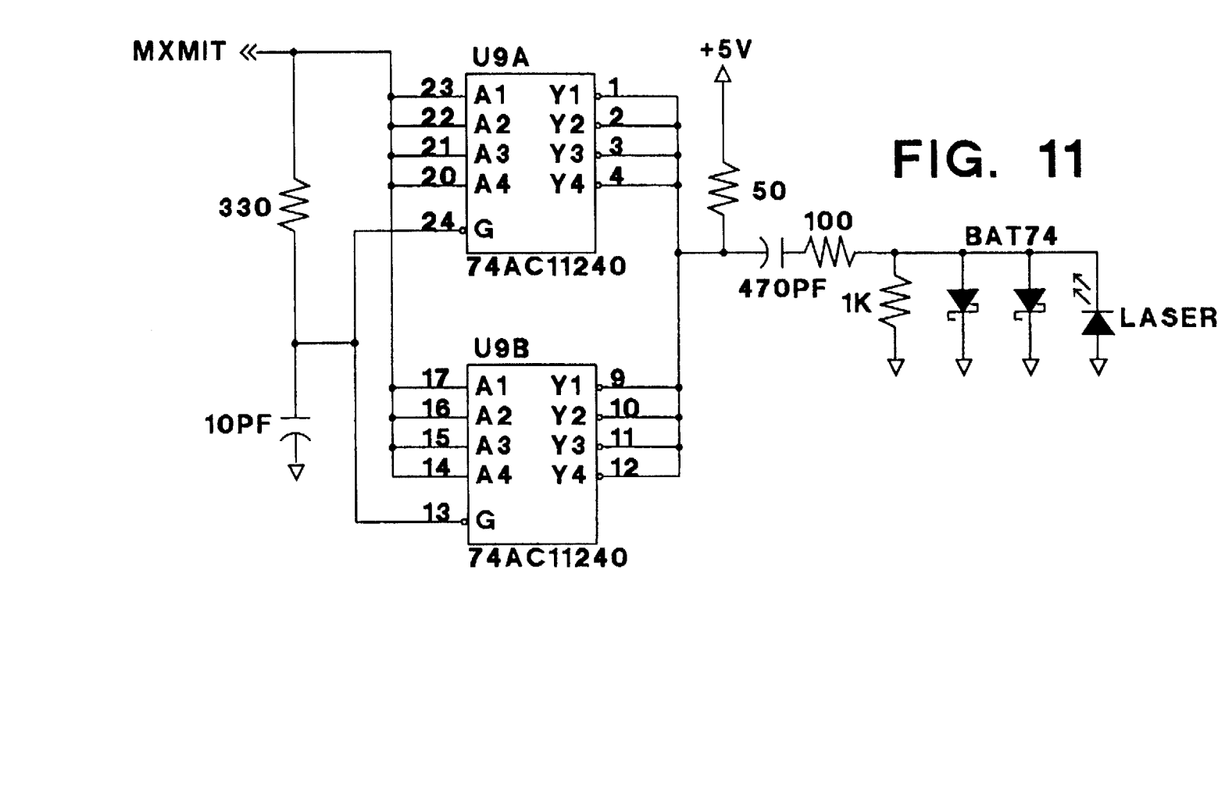
FIG. 11 is an exemplary schematic of the master light transmitter shown in FIG. 1.
Figure 12:
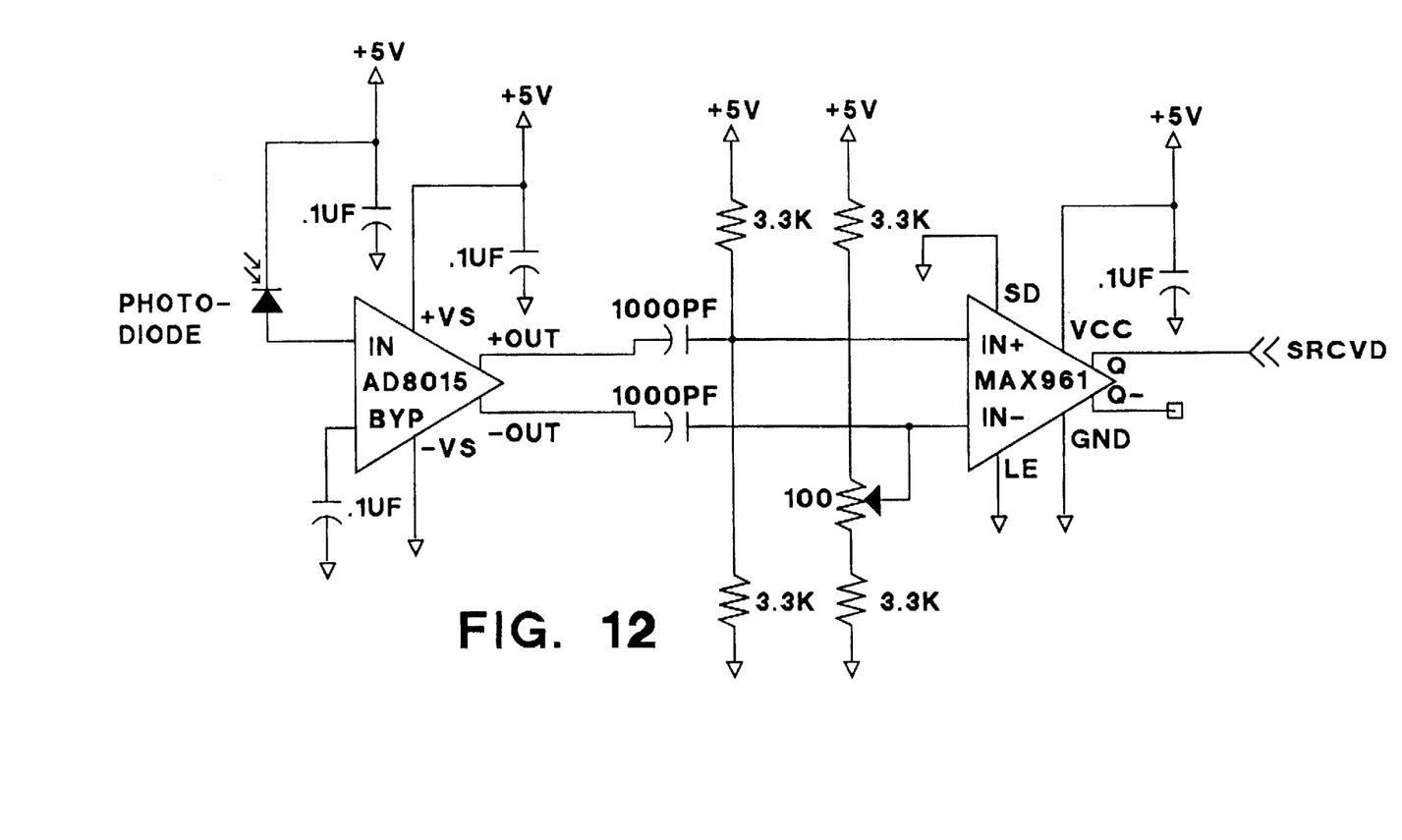
FIG. 12 is an exemplary schematic of the slave receiver shown in FIG. 1.
Figure 13:
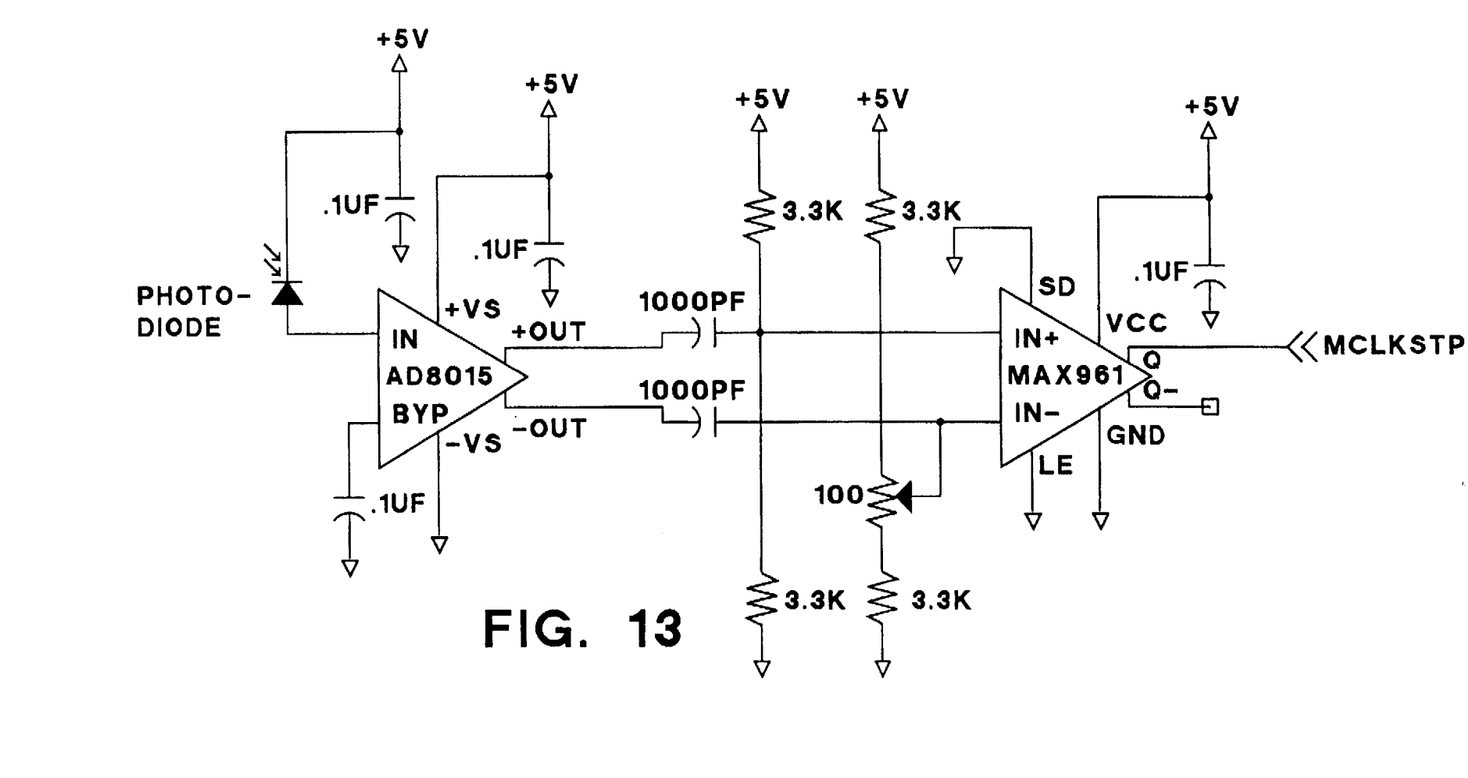
FIG. 13 is an exemplary embodiment of the master receiver shown in FIG. 1.
Figure 14:
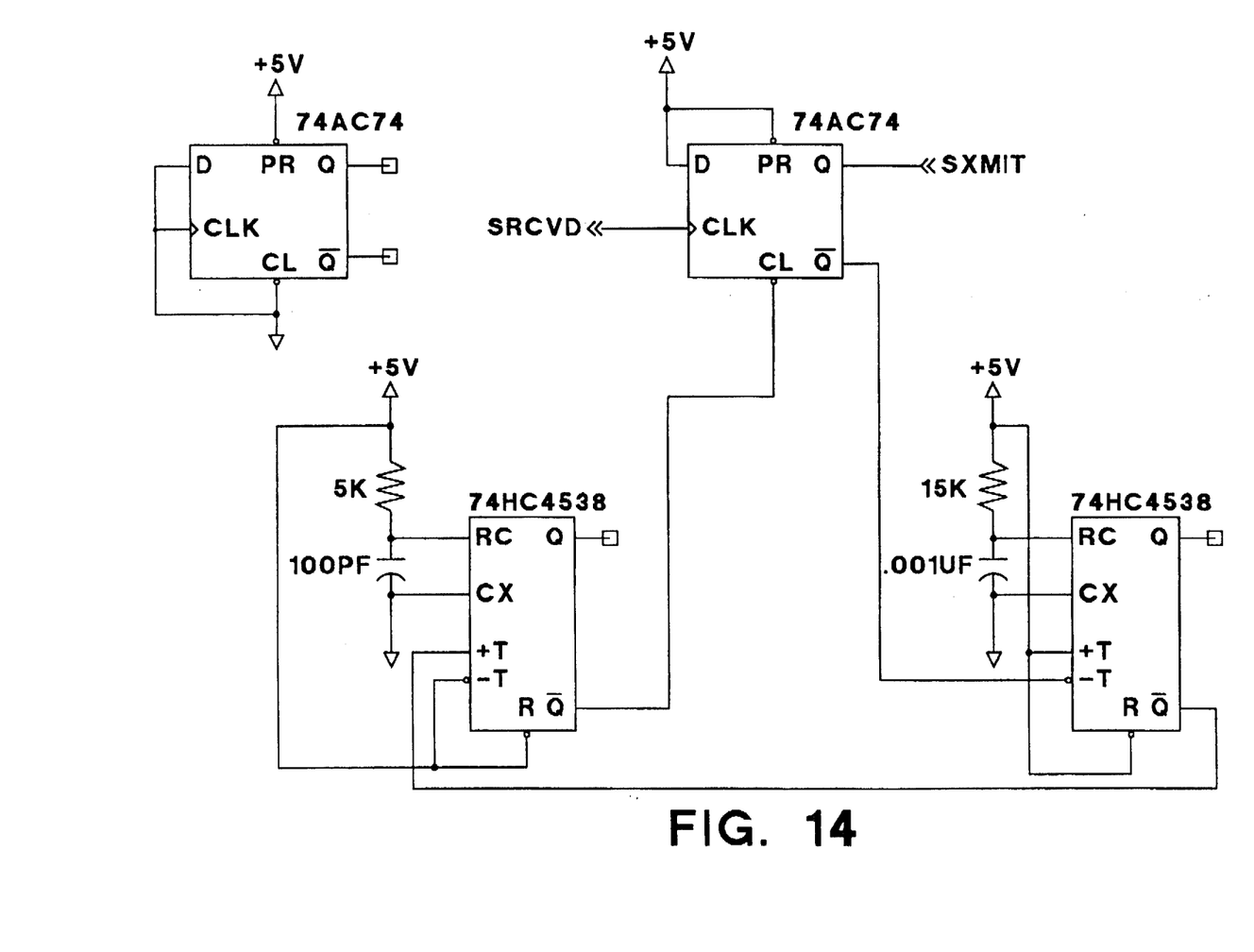
FIG. 14 is an exemplary embodiment of the repeat lockout timer shown in FIG. 7.
Figure 15:
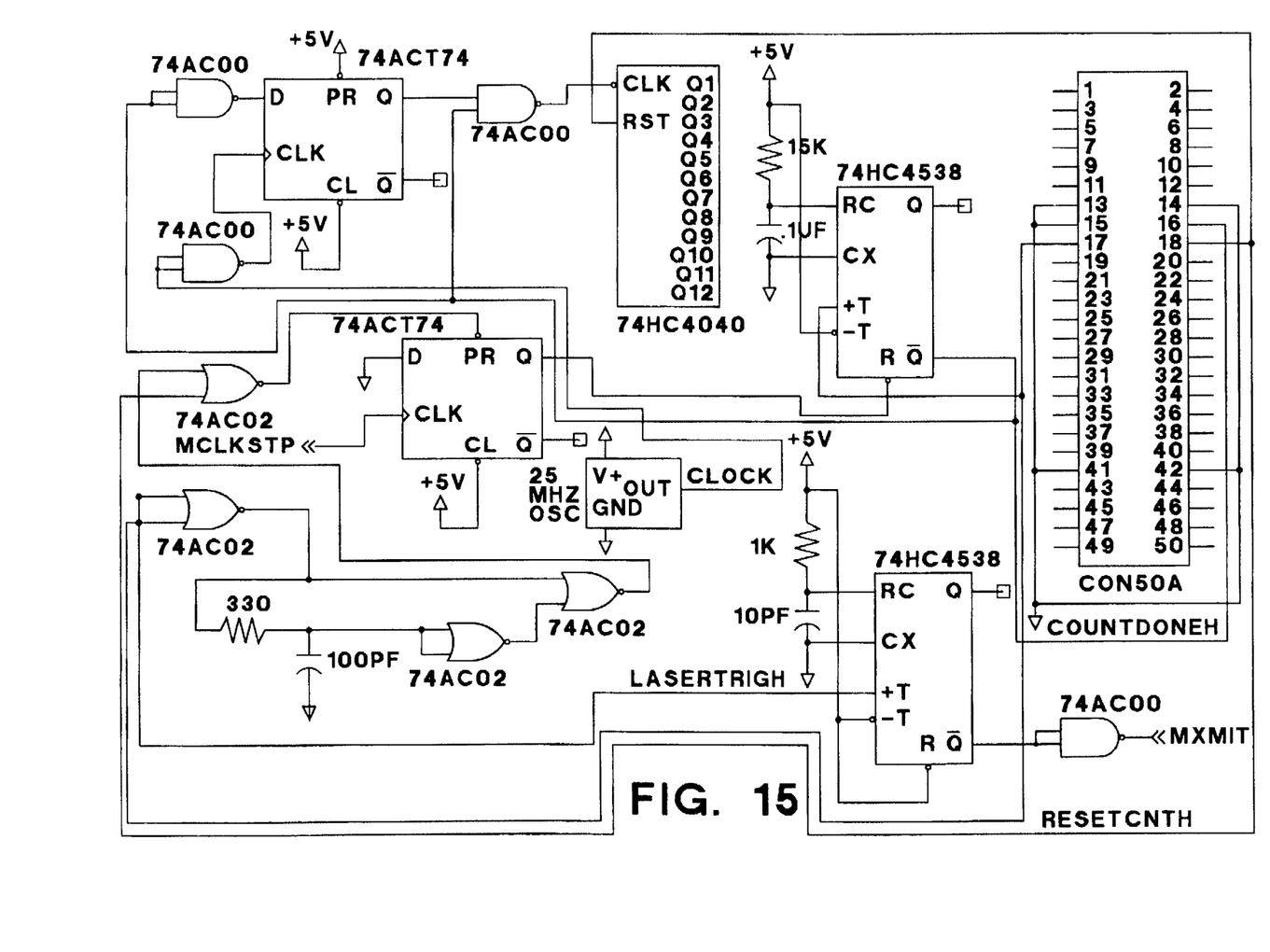
FIG. 15 is an exemplary embodiment of the master timing and control unit shown in FIG. 1.

Referring to FIG. 8, alternatively the same optical device may be used as both the emitter and detector of light in the master unit 10. Referring to FIG. 9, alternatively the same optical device may be used as both the emitter and detector of light in the slave unit 12. For example, a laser diode or light emitting diode can also generate a current in an external circuit when illuminated by light of an appropriate wavelength.

FIGS. 10–15 are schematics of an exemplary embodiment of the actual device shown in FIG. 1.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A measuring system comprising:
   (a) a first circuit that produces a first signal;
   (b) a transmission line having a first end and a second end, said first end of said transmission line being interconnected with said first circuit so as to receive said first signal;
   (c) a second circuit remotely located from said first end of said transmission line, said second circuit being interconnected with said second end of said transmission line so as to detect said first signal;
   (d) said second circuit in response to detection of said first signal produces a second signal;
   (e) said second end of said transmission line being interconnected with said second circuit so as to receive said second signal;
   (f) said first circuit being interconnected with said first end of said transmission line so as to detect said second signal; and
   (g) said first circuit in response to detection of said second signal determines the length of said transmission line.

2. The measuring system of claim 1 wherein at least one of said first signal and said second signal is an optical pulse.

3. The measuring system of claim 2 wherein at least one of said first signal and said second signal is a range of wavelengths.

4. The measuring system of claim 1 wherein said transmission line is a fibre optical cable.

5. The measuring system of claim 1 wherein said transmission line is an electrically conductive wire.

6. The measuring system of claim 1 wherein said transmission line is a twisted pair of wires.

7. The measuring system of claim 1 wherein the frequency of said first signal is different than the frequency of said second signal.

8. The measuring system of claim 1 wherein the frequency of said first signal is the same as the frequency of said second signal.

9. The measuring system of claim 1 wherein said length is calculated in response to the elapsed time from transmission of said first signal to receiving of said second signal.

10. The measuring system of claim 1 wherein said first circuit includes a coupler connected to said first end of said transmission line, said coupler permits said first signal produced by said first circuit to enter said transmission line, said coupler permits said second signal produced by said second circuit to be received by a detector, and said coupler prevents any reflections of said first signal within said transmission line to be received by said detector.

11. The measuring system of claim 10 wherein said coupler includes a beamsplitter.

12. The measuring system of claim 10 wherein said coupler includes a fused biconical taper fiber coupler.

13. The measuring system of claim 1 where said first circuit includes a transmitter that produces said first signal and a receiver that receives said second signal, said transmitter and said receiver is the same electronic device.

14. The measuring system of claim 13 wherein said transmitter and said receiver is at least one of a diode and an electron tube.

15. A method of measuring the length of a transmission line comprising the steps of:
   (a) producing a first signal by a first circuit;
   (b) receiving said first signal by a first end of a transmission line being interconnected with said first circuit;
   (c) detecting said first signal from a second end of said transmission line by a second circuit remotely located from said first circuit;
   (d) producing a second signal by said second circuit in response to said detecting of said first signal;
   (e) receiving said second signal by said second end of said transmission line;
   (f) said first circuit detecting said second signal from said first end of said transmission line; and
   (g) determine the length of said transmission line in response to said detecting of said second signal.

16. The method of claim 15 wherein the frequency of said first signal is different than the frequency of said second signal.

17. The method of claim 15 wherein the frequency of said first signal is the same as the frequency of said second signal.

* * * * *